(12) United States Patent  
Sun (10) Patent No.: US 8,789,318 B1  
(45) Date of Patent: Jul. 29, 2014

(54) DOME STRUCTURE

(71) Applicant: Xiaoping Sun, Trophy Club, TX (US)

(72) Inventor: Xiaoping Sun, Trophy Club, TX (US)

(*) Notice: Subject to any disclaimer, the term of this patent is extended or adjusted under 35 U.S.C. 154(b) by 0 days.

(21) Appl. No.: 13/775,651

(22) Filed: Feb. 25, 2013

(51) Int. Cl.  
*E04B 7/08* (2006.01)

(52) U.S. Cl.  
USPC ............................................. 52/81.3; 52/81.1

(58) Field of Classification Search  
CPC .......... E04B 1/3211; E04B 1/19; E04B 7/102  
USPC ........................... 52/81.3, 81.1, 81.2; 359/451  
See application file for complete search history.

(56) References Cited

U.S. PATENT DOCUMENTS

| | | | | |
|---|---|---|---|---|
| 2,978,074 A * | 4/1961 | Schmidt | ............................ | 52/81.2 |
| 3,002,590 A * | 10/1961 | Hannoosh et al. | ............. | 52/81.2 |
| 3,802,132 A * | 4/1974 | Sumner | ............................ | 52/81.3 |
| 4,092,810 A * | 6/1978 | Sumner | ............................ | 52/81.4 |
| 4,262,461 A * | 4/1981 | Johnson et al. | ................ | 52/81.3 |
| 4,464,073 A * | 8/1984 | Cherry | ............................ | 403/170 |
| 4,750,807 A * | 6/1988 | Chamayou dit Felix | ..... | 359/451 |
| 8,347,561 B2 * | 1/2013 | Howe | ............................. | 52/81.3 |
| 2002/0112413 A1 * | 8/2002 | Hoberman | ........................ | 52/71 |
| 2006/0288950 A1 * | 12/2006 | Cartwright et al. | ........... | 119/223 |

* cited by examiner

*Primary Examiner* — Basil Katcheves  
(74) *Attorney, Agent, or Firm* — IPro, Inc.; Na Xu (57) ABSTRACT

Described herein is a structure that comprises a plurality of spherical triangular units on a plurality of levels. The structure has a superior ability to survive disasters such as tornadoes, hurricanes, earthquakes etc. It is cost-efficient, energy efficient, extremely durable and easily maintained. The plurality of spherical triangular units on one level of the plurality of levels are essentially identical to each other, and are essentially equally spaced radially relative to a center of the sphere; each of the plurality of spherical triangular units comprises three planar panels, each with an end surface comprising a minor arc of a great circle of the sphere; a spherical triangular unit on a level above the first level of the structure is configured to be joined with two neighboring spherical triangular units on the level below; the structure is substantially a dome.

15 Claims, 12 Drawing Sheets

DOME STRUCTURE

BACKGROUND

Emergency shelters are structures built for residence and dwelling during or after a manmade or natural disaster, such as a fire, flood, tornado or earthquake. In some disasters such as tornados, survival depends heavily on the mechanical strength and quality of the emergency shelters. Temporary emergency shelters available on the market that are adaptable to individual use, such as inexpensive tents, lack the necessary strength, durable quality, and environmental conformability for survival during a natural disaster. Emergency shelters that overcome some of the disadvantages of temporary shelters are often built primarily for other purposes, such as schools, churches, gymnasiums, etc. They are more expensive and difficult to build, are not practical to be owned by a family, and are sometimes not available at a near distance to a person in need of survival during a disaster situation.

A spherical ball or a round ball is a three dimensional object that has a spherical surface, characterized as a perfectly round geometrical object in a three-dimensional space. A spherical surface has a set of points that are all the same distance, which is referred to as the radius of the sphere or r, from a given point in space. The given point is known as the center of the sphere. The shortest path connecting two points lying entirely in the sphere is a minor arc of the great circle passing the points. On a sphere, a central angle of an arc of a great circle is an angle spanned by the radii from each end of the arc to the center of the sphere. A plane section of a sphere is a circle. A great circle, also known as an orthodrome or Riemannian circle, of a sphere is the intersection of the sphere and a plane which passes through the center point of the sphere, as opposed to a general circle of a sphere where the plane is not required to pass through the center. A sphere may be divided into two equal hemispheres by any plane that passes through its center.

A spherical ball is unique in many ways. For instance, in comparison to other three dimensional objects, a spherical ball has the largest volume for the smallest surface area: the sphere has the smallest surface area among all surfaces enclosing a given volume and it encloses the largest volume among all closed surfaces with a given surface area.

For the reason above, a building structure made in resemblance to a sphere may have the benefit of lower consumption of construction materials, lower cost, higher enclosed space for use, higher structural strength and better safety. Such a structure that resembles a hemisphere or the hollow upper half of a sphere is often referred to as a dome. Dome structures made of various materials have a long architectural lineage. Their prevalence in use has resulted in may types and variations, such as an onion dome, corbel dome, geodesic dome, oval dome, polygonal dome, sail dome, saucer dome, umbrella dome, etc.

SUMMARY

Described herein is a structure comprising a first spherical triangular unit, a second spherical triangular unit and a third spherical triangular unit; the first spherical triangular unit comprising a first planar panel, a second planar panel and a third planar panel; the second spherical triangular unit comprising a fourth planar panel, a fifth planar panel and a sixth planar panel; the third spherical triangular unit comprising a seventh planar panel, an eighth planar panel and a ninth planar panel; the first planar panel comprising a first end surface, the second planar panel comprising a second end surface, the third planar panel comprising a third end surface; the fourth planar panel comprising a fourth end surface, the fifth planar panel comprising a fifth end surface, and the sixth planar panel comprising a sixth end surface; the seventh planar panel comprising a seventh end surface, the eighth planar panel comprising an eighth end surface, and the ninth planar panel comprising a ninth end surface.

Wherein the first end surface comprises a minor arc of a first great circle of a sphere; wherein the second end surface comprises a minor arc of a second great circle of the sphere; wherein the third end surface comprises a minor arc of a third great circle of the sphere; wherein the fourth end surface comprises a minor arc of a fourth great circle of the sphere; wherein the fifth end surface comprises a minor arc of a fifth great circle of the sphere; wherein the sixth end surface comprises a minor arc of the third great circle of the sphere; wherein the seventh end surface comprises a minor arc of a seventh great circle of the sphere; wherein the eighth end surface comprises a minor arc of an eighth great circle of the sphere; wherein the ninth end surface comprises a minor arc of a ninth great circle of the sphere.

Wherein the seventh planar panel and the ninth planar panel join and form a corner of the third spherical triangular unit, the first planar panel and the second planar panel join and form a corner of the first spherical triangular unit, the corner of the first spherical triangular unit is connected to the corner of the third spherical triangular unit; and wherein the eighth planar panel and the ninth planar panel join and form another corner of the third spherical triangular unit, the fourth planar panel and the fifth planar panel join and form a corner of the second spherical triangular unit, the other corner of the third spherical triangular unit is connected to the corner of the second spherical triangular unit.

According to an embodiment of the structure, central angles of the first end surface, second end surface, third end surface, fourth end surface, fifth end surface and sixth end surface are essentially the same. As used herein, a central angle of an end surface comprising an arc is the central angle of the arc.

According to an embodiment of the structure, central angles of the seventh, eighth and ninth end surfaces are essentially the same.

According to an embodiment of the structure, the first planar panel extends from the first end surface toward a center of the sphere along a surface of the first great circle; the second planar panel extends from the second end surface toward the center of the sphere on a surface of the second great circle; and the third planar panel extends from the third end surface toward the center of the sphere on a surface of the third great circle.

According to an embodiment of the structure, the first planar panel extends from the first end surface to a first inner end surface which comprises arc concentric with the first end surface; wherein the second planar panel extends from the second end surface to a second inner end surface which comprises an arc concentric with the second end surface; wherein the third planar panel extends from the third end surface to a third inner end surface which comprises an arc concentric with the third end surface.

According to an embodiment of the structure, central angles of the first, second, and third inner end surfaces are essentially the same.

According to an embodiment of the structure, radii of the first, second, and third inner end surfaces are essentially the same.

According to an embodiment of the structure, the first and the second planar panel are joined by a hinge; the second and third planar panels are joined by a hinge; the first and third planar panels are joined by a hinge. Preferably, the hinge is a butt hinge.

According to an embodiment, the structure further comprises one or more intra-triangular-unit covers; the first, second and third planar panels comprise one or more inner ridges configured to accept or secure the one or more intra-triangular-unit covers, that are configured to fit into and cover an intra-unit opening of the first triangular unit.

According to an embodiment the structure further comprises one or more inter-triangular-unit covers; the first, second and third planar panels comprise one or more outer ridges configured to accept or secure the one or more inter-triangular-unit covers, that are configured to fit into and cover an inter-unit opening of adjacent spherical triangular units. According to an embodiment, the first, second and third spherical triangular units are adjacent spherical triangular units.

According to an embodiment, when there are two or more intra-triangular-unit covers, the structure further comprises a material filled between the two or more intra-triangular-unit covers.

According to an embodiment, when there are two or more inter-triangular-unit covers, the structure further comprises a material filled between the two or more inter-triangular-unit covers.

According to an embodiment, the structure further comprises a plurality of plates, configured to connect the first spherical triangular unit to the third spherical triangular unit and to connect the second spherical triangular unit to the third spherical triangular unit.

According to an embodiment, the structure further comprises a plurality of fasteners configured to join the plurality of plates to the first, second or third spherical triangular units through a plurality of through holes on the first, second and third spherical triangular units.

According to an embodiment of the structure, at least one of the plurality of fasteners comprises a ring configured to accept wiring therethrough.

According to an embodiment of the structure, at least one of the first, second and third planar panels comprise a material selected from a group consisting of aluminum, iron, steel, glass fiber, carbon fiber, plastic, wood and a combination thereof.

According to an embodiment of the structure, the ninth great circle passes through an intersection of the first end surface and the second end surface and passes through an intersection of the fourth end surface and the fifth end surface; wherein the ninth end surface is a minor arc of the ninth circle between the intersection of the first end surface and the second end surface and the intersection of the fourth end surface and the fifth end surface.

According to an embodiment, the structure further comprises a first plurality of spherical triangular units, each of which is essentially identical to the first spherical triangular unit; the second spherical triangular unit is essentially identical to the first spherical triangular unit; wherein the first plurality of spherical triangular units and the first and second spherical triangular units are essentially equally spaced radially along the third great circle, and constitute a first level of the structure.

According to an embodiment, the structure further comprises a second plurality of spherical triangular units, each of which is essentially identical to the third spherical triangular unit; wherein the second plurality of spherical triangular units and the third spherical triangular unit are essentially equally spaced radially along the ninth great circle, and constitute a second level of the structure.

According to an embodiment, the structure further comprises a plurality of levels comprising a plurality of spherical triangular units; the plurality of spherical triangular units on one level of the plurality of levels are essentially identical to each other, and are essentially equally spaced radially relative to a center of the sphere; each of the plurality of spherical triangular units located on a level above the first level comprises three planar panels, each with an end surface comprising a minor arc of a great circle of the sphere; a spherical triangular unit on a level above the first level of the structure is configured to be joined with two neighboring spherical triangular units on the level below; the structure is substantially a dome.

DETAILED DESCRIPTION

Figure 1:
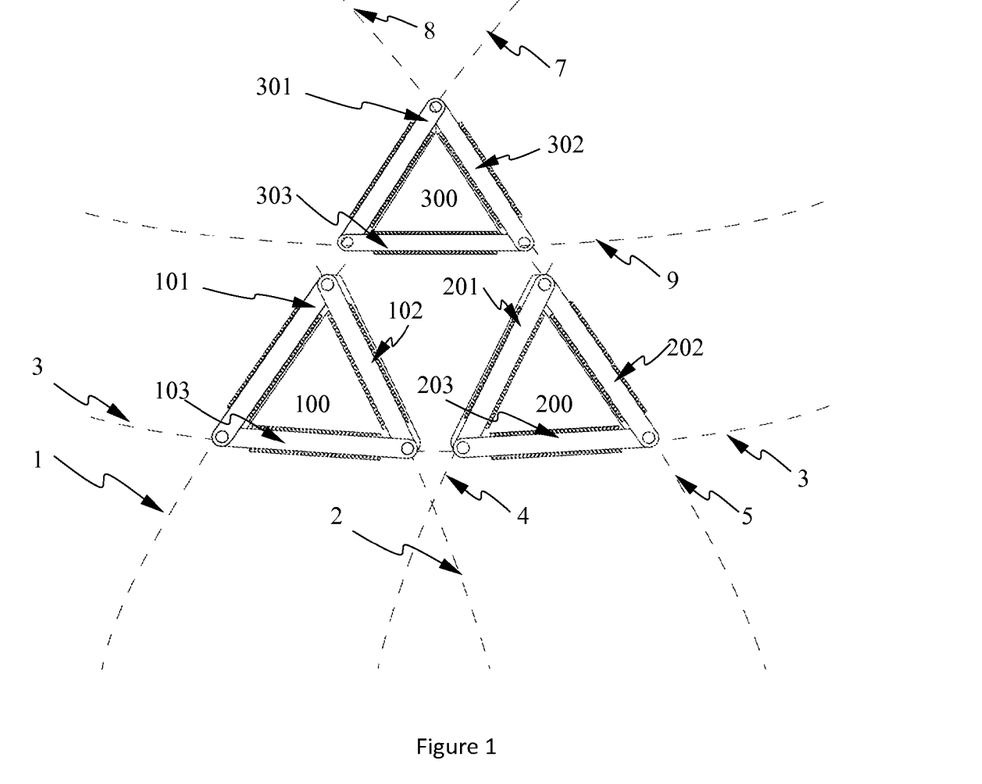
FIG. 1 shows an embodiment of the structure showing a first spherical triangular unit, a second spherical triangular unit and a third spherical triangular unit.

According to an embodiment as shown in FIG. 1, a structure comprises a first spherical triangular unit 100, a second spherical triangular unit 200 and a third spherical triangular unit 300. The first spherical triangular unit 100 comprises a first planar panel 110, a second planar panel 120 and a third planar panel 130; the second spherical triangular unit comprises a fourth planar panel 210, a fifth planar panel 220 and a sixth planar panel 230; the third spherical triangular unit comprises a seventh planar panel 310, an eighth planar panel 320 and a ninth planar panel 330.

The first planar panel 110 comprises a first end surface 101, the second planar panel 120 comprises a second end surface 102, the third planar panel 130 comprises a third end surface 103; the fourth planar panel 210 comprises a fourth end surface 201, the fifth planar panel 220 comprises a fifth end surface 202, and the sixth planar panel 230 comprises a sixth end surface 203; the seventh planar panel 310 comprises a seventh end surface 301, the eighth planar panel 320 comprises an eighth end surface 302, and the ninth planar panel 330 comprises a ninth end surface 303.

Figure 10:
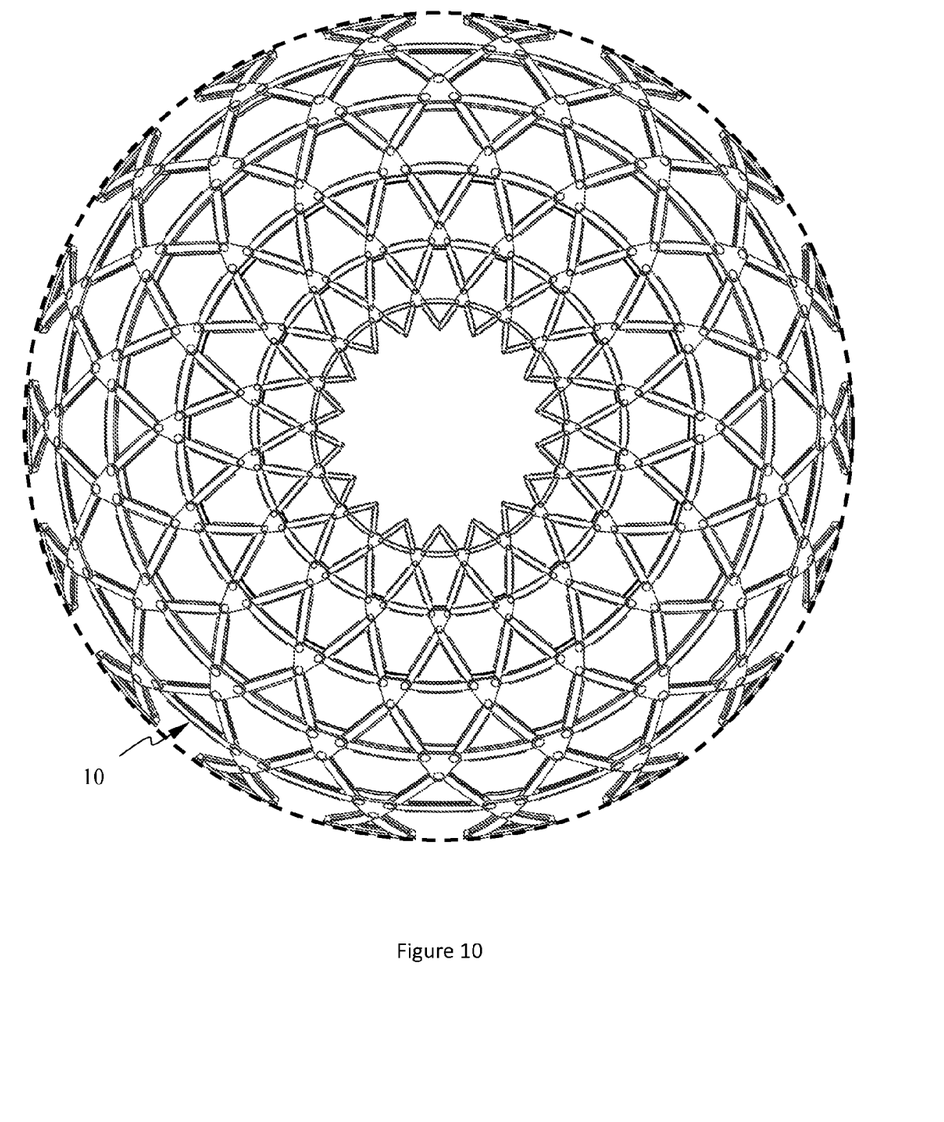
FIG. 10 is a top view of the structure being a multiple level dome, according to an embodiment.

The first end surface 101 comprises a minor arc of a first great circle 1 of a sphere 10 (see FIG. 10). The second end surface 102 comprises a minor arc of a second great circle 2 of the sphere 10. The third end surface 103 comprises a minor arc of a third great circle 3 of the sphere 10. The fourth end surface 201 comprises a minor arc of a fourth great circle 4 of the sphere 10. The fifth end surface 202 comprises a minor arc of a fifth great circle of 5 the sphere 10. The sixth end surface 203 comprises a minor arc of the third great circle 3 of the sphere 10. The seventh end surface 301 comprises a minor arc of a seventh great circle 7 of the sphere 10. The eighth end surface 302 comprises a minor arc of an eighth great circle 8 of the sphere 10. The ninth end surface 303 comprises a minor arc of a ninth great circle 9 of the sphere 10.

Wherein the seventh planar panel 301 and the ninth planar panel 303 join and form a corner of the third spherical triangular unit 300; the first planar panel 101 and the second planar panel 102 join and form a corner of the first spherical triangular unit 100; the corner of the first spherical triangular unit 100 is connected to the corner of the third spherical triangular unit 300. Wherein the eighth planar panel 302 and the ninth planar panel 303 join and form another corner of the third spherical triangular unit 300, the fourth planar panel 201 and the fifth planar panel 202 join and form a corner of the second spherical triangular unit 200, the other corner of the third spherical triangular unit 300 is connected to the corner of the second spherical triangular unit 200.

As shown in FIG. 1, central angles of the first end surface, second end surface, third end surface, fourth end surface, fifth end surface and sixth end surface are essentially the same.

As shown in FIG. 1, central angles of the seventh, eighth and ninth end surfaces are essentially the same.

Figure 2:
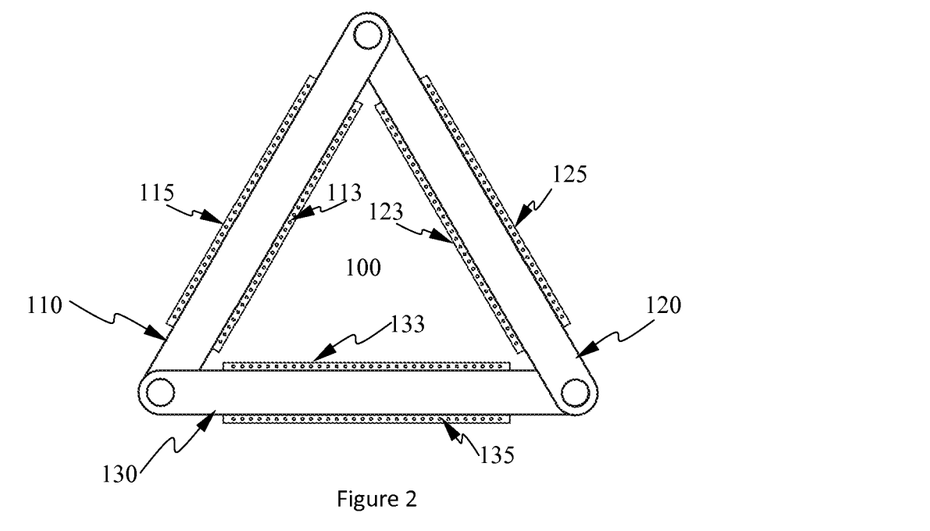
FIG. 2 is a front view of the first spherical triangular unit in the structure according to an embodiment.
Figure 3:
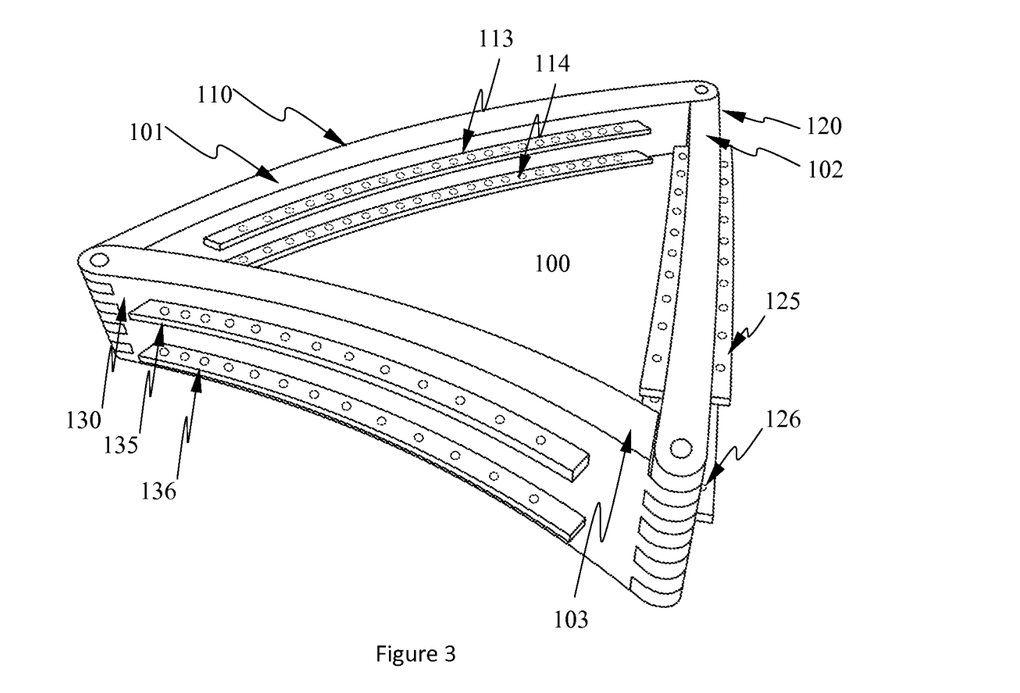
FIG. 3 is a perspective view of the first spherical triangular unit in the structure according to an embodiment.

As shown in FIGS. 2-4, the first planar panel 110 extends from the first end surface 101 toward a center of the sphere along a surface of the first great circle; the second planar panel 120 extends from the second end surface 102 toward the center of the sphere on a surface of the second great circle; and the third planar panel 130 extends from the third end surface 103 toward the center of the sphere on a surface of the third great circle.

As shown in FIG. 1, the ninth great circle passes through an intersection of the first end surface and the second end surface and passes through an intersection of the fourth end surface and the fifth end surface; wherein the ninth end surface is a minor arc of the ninth great circle between the intersection of the first end surface and the second end surface and the intersection of the fourth end surface and the fifth end surface.

Figure 4A:
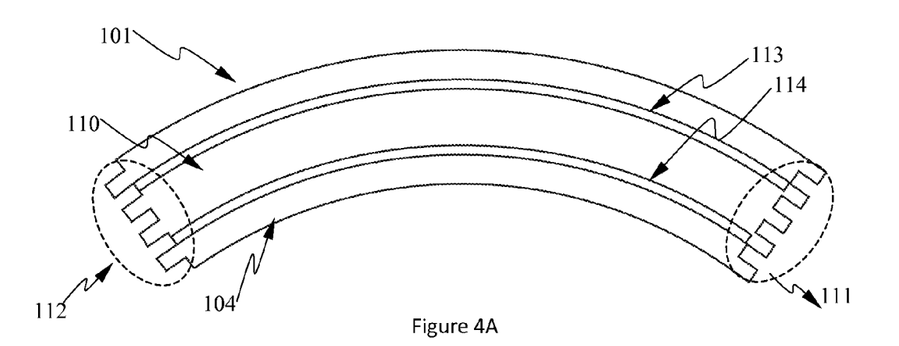
FIG. 4A is a bottom view of the first planar panel of the first spherical triangular unit.
Figure 4B:
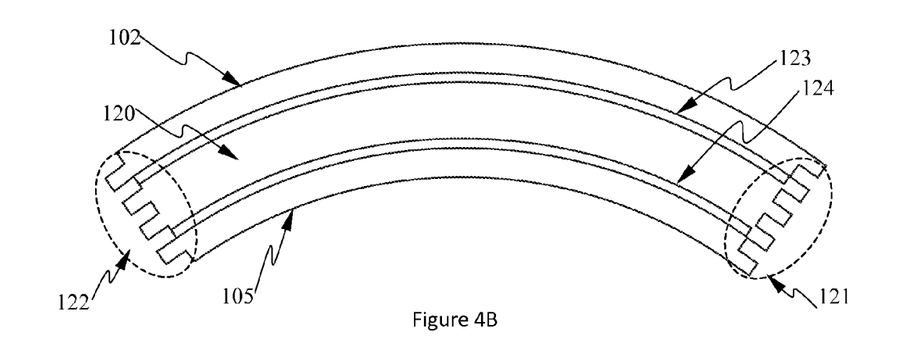
FIG. 4B is a bottom view of the second planar panel of the first spherical triangular unit.
Figure 4C:
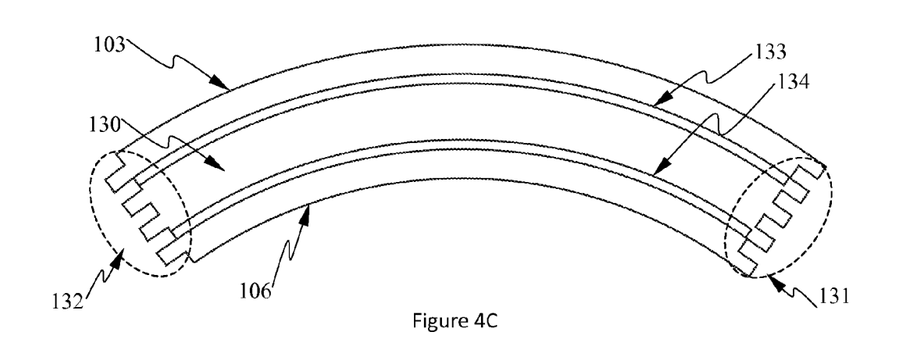
FIG. 4C is a bottom view of the third planar panel of the first spherical triangular unit.
Figure 4D:
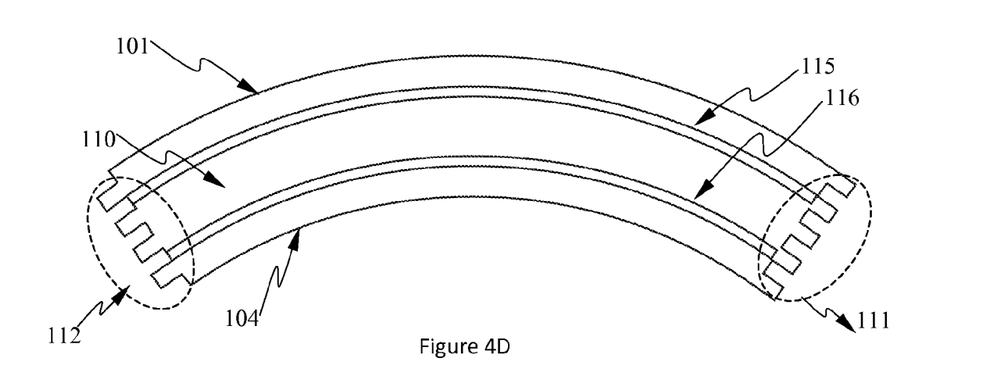
FIG. 4D is a top view of the first planar panel of the first spherical triangular unit.
Figure 4E:
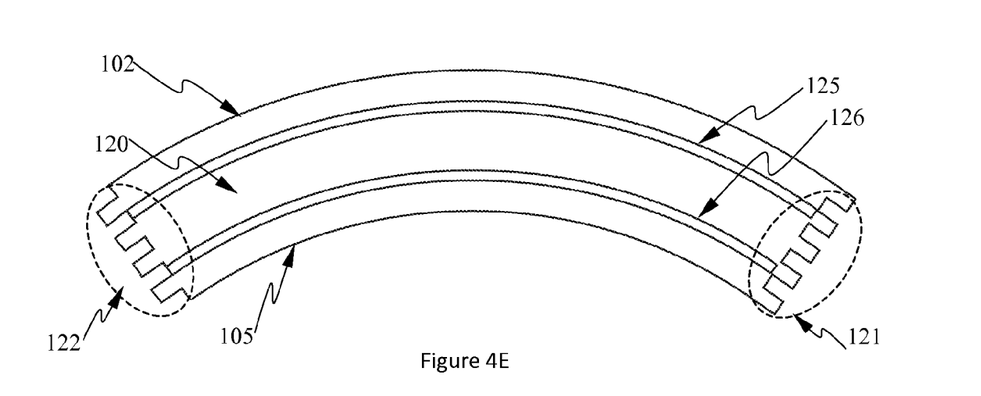
FIG. 4E is a top view of the second planar panel of the first spherical triangular unit.
Figure 4F:
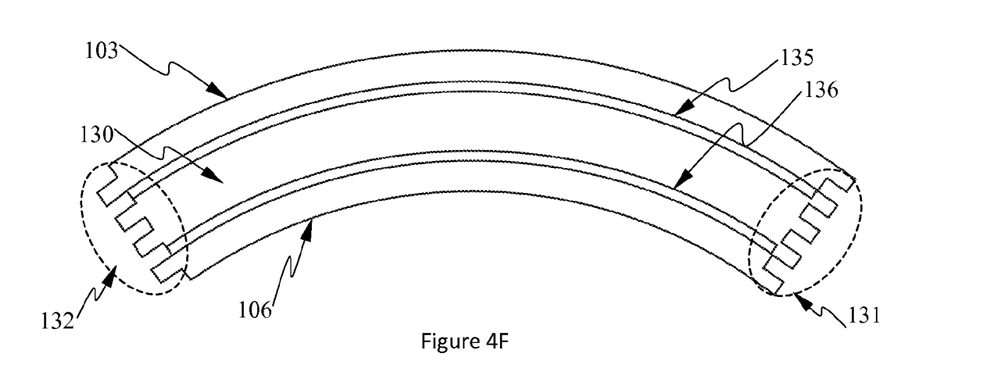
FIG. 4F is a top view of the third planar panel of the first spherical triangular unit.
Figure 4G:
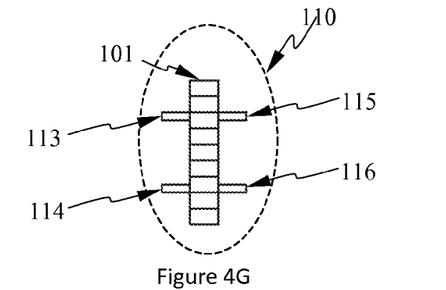
FIG. 4G is a side view of the first planar panel of the first spherical triangular unit.
Figure 4H:
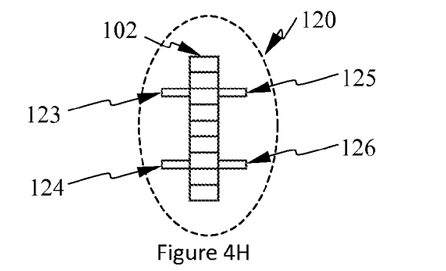
FIG. 4H is a side view of the second planar panel of the first spherical triangular unit.
Figure 4I:
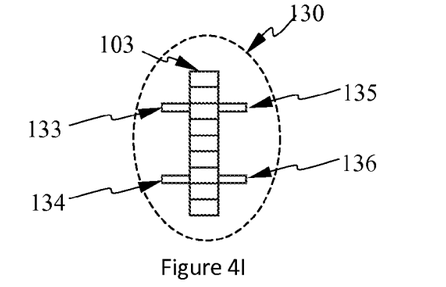
FIG. 4I is a side view of the third planar panel of the first spherical triangular unit.

As shown in FIG. 4A, the first planar panel 110 extends from the first end surface 101 to a first inner end surface 104 which is comprises arc concentric with the first end surface 101; as shown in FIG. 4B, the second planar panel 120 extends from the second end surface 102 to a second inner end surface 105 which is an comprises concentric with the second end surface 102; as shown in FIG. 4C, the third planar panel 130 extends from the third end surface 103 to a third inner end surface 106 which is comprises arc concentric with the third end surface.

According to an embodiment of the structure, central angles of the first inner end surface 104, second inner end surface 105, and third inner end surface 106 are essentially the same.

According to an embodiment of the structure, radii of the first inner end surface 104, second inner end surface 105, and third inner end surface 106 are essentially the same.

As shown in FIG. 4A, the first planar panel 110 comprises a hinge 111 on a first end of the first planar panel, and a hinge 112 on a second end of the first planar panel; as shown in FIG. 4B, the second planar panel 120 comprises a hinge 121 on a first end of the second planar panel, and a hinge 122 on a second end of the second planar panel; as shown in FIG. 4C, the third planar panel 130 comprises a hinge 131 on a first end of the third planar panel, and a hinge 132 on a second end of the third planar panel. Preferably, all the hinges are butt hinges.

As shown in FIGS. 2-3, the first and the second planar panel are joined by a hinge 111 with a hinge 122; the second and third planar panels are joined by a hinge 121 with a hinge 132; the first and third planar panels are joined by a hinge 112 with a hinge 131. Preferably, all the hinges are butt hinges.

Figure 4J:
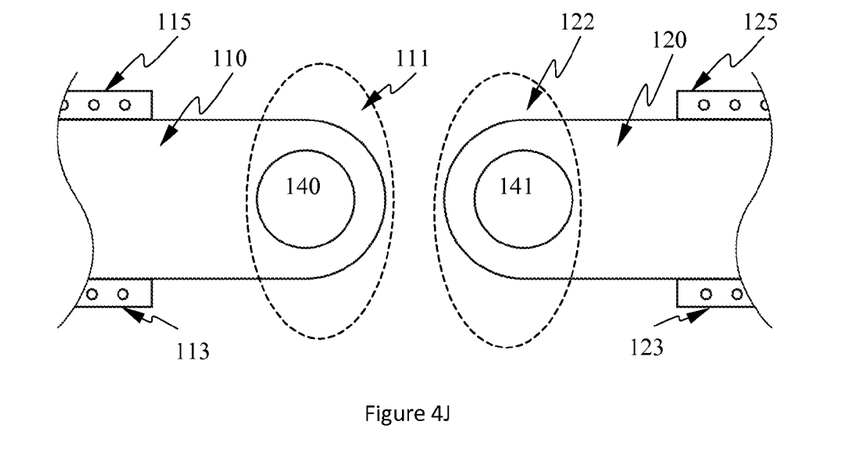
FIG. 4J is a front view of the first and second planar panel of the first spherical triangular unit.

As shown in FIGS. 2-3 and FIG. 4J, the hinges comprise through holes configured to allow two adjoining hinges to be secured together by a fastener. As shown in FIGS. 2-3, when adjoining hinges of three planar panels are aligned and the through holes of the two adjoining hinges are secured together, three planar panels are assembled into a spherical triangular unit. Preferably, as shown in FIG. 4J, a through hole 140 of the hinge 111 and a through hole 141 of the hinge 122 are essentially the same in size.

According to an embodiment of the structure, at least one of the first, second and third planar panels comprise a material selected from a group consisting of aluminum, iron, steel, glass fiber, carbon fiber, plastic, wood and a combination thereof.

As shown in FIGS. 2-5, the first, second and third planar panels comprise one or more inner ridges configured to accept or secure one or more intra-triangular-unit covers 150 that are configured to fit into and cover an intra-unit opening of the first triangular unit.

As shown in FIGS. 2-5, the first, second and third planar panels comprise one or more outer ridges configured to accept or secure one or more inter-triangular-unit covers 151 that are configured to fit into and cover an inter-unit opening of adjacent spherical triangular units.

According to an embodiment, when there are two or more intra-triangular-unit covers, the structure further comprises a material filled between the two or more intra-triangular-unit covers. The material is preferably intended for use in thermal insulation, mechanical enforcement, fire prevention, noise reduction, vibration reduction or a combination thereof.

According to an embodiment, when there are two or more inter-triangular-unit covers, the structure further comprises a material filled between the two or more inter-triangular-unit covers. The material is preferably intended for use in thermal insulation, mechanical enforcement, fire prevention, noise reduction, vibration reduction or a combination thereof.

Preferably, as shown in FIGS. 2-4, each planar panel comprises two inner ridges on a surface of the planar panel facing an inside of a spherical triangular unit assembled from the planar panel and two additional planar panels; each planar panel further comprises two outer ridges on a surface of the planar panel facing an outside of the spherical triangular unit assembled from the planar panel and two additional planar panels.

FIG. 3 is a perspective view showing the assembled first triangular unit according to an embodiment. FIG. 4 shows the planar panels 110, 120 and 130 of the first triangular unit comprising inner and outer ridges. As shown in FIG. 3, FIG. 4A, 4D, 4G the first planar panel 110 comprises inner ridges 113 and 114 on a surface of the first planar panel facing inside the first triangular unit when assembled, and comprises outer ridges 115 and 116 on a surface of the first planar panel facing a outside the first triangular unit when assembled. As shown in FIG. 3 and FIGS. 4B, 4E, 4H, the second planar panel 120 comprises inner ridges 123 and 124 on a surface of the second planar panel facing the inside the first triangular unit when assembled, and comprises outer ridges 125 and 126 on a surface of the second planar panel facing the outside the first triangular unit when assembled. As shown in FIG. 3 and FIGS. 4C, 4F, 4I, the third planar panel 130 comprises inner ridges 133 and 134 on a surface of the third planar panel facing the inside the first triangular unit when assembled, and comprises outer ridges 135 and 136 on a surface of the third planar panel facing outside the first triangular unit when assembled.

In FIGS. 4A-B, an inner ridge or an outer ridge is concentric to an end surface of a planar panel that comprises such inner ridge or outer ridge. According to an embodiment as shown in FIG. 4A, two inner ridges 113 and 114 of the first planar panel 110 are concentric to the first end surface 101; as shown in FIG. 4B, two inner ridges 123 and 124 of the second planar panel 120 are concentric to the second end surface 102; as shown in FIG. 4C, two inner ridges 133 and 134 of the third planar panel 130 are concentric to the third end surface 103.

Figure 5:
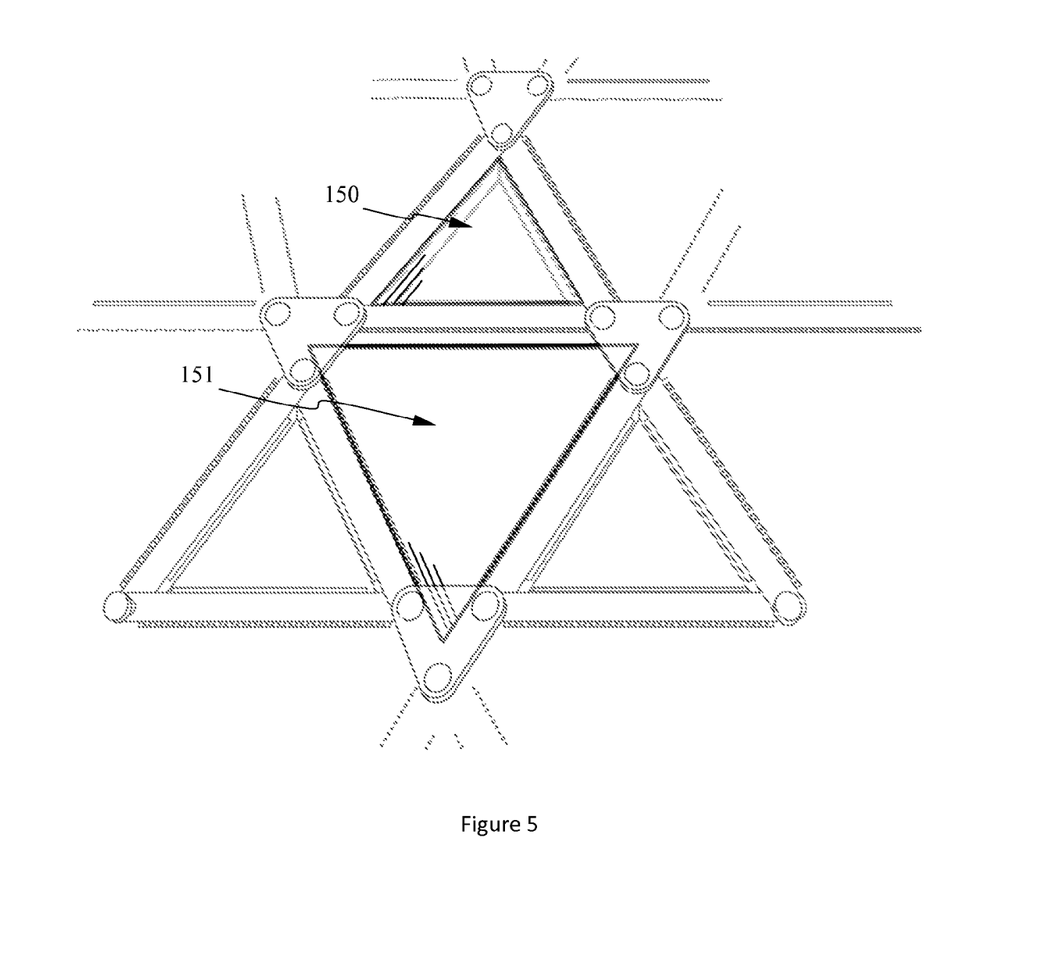
FIG. 5 shows an intra-triangular-unit cover and an inter-triangular cover according an embodiment.

As shown in FIG. 5, preferably, the ridges comprise a series of through holes along a direction that is substantially perpendicular to an end surface of a planar panel comprising such ridges. The through holes on the ridges are configured to accept or secure an intra- or inter-triangular-unit cover to the ridges.

As shown in FIGS. 5-8, the structure further comprises a plurality of plates, configured to connect the first spherical triangular unit to the third spherical triangular unit, and to connect the second spherical triangular unit to the third spherical triangular unit.

As shown in FIGS. 5-8, the structure further comprises a plurality of fasteners configured to join a plurality of plates to the first, second or third spherical triangular units through a plurality of through holes on the first, second or third spherical triangular units. At least one of the plurality of fasteners comprises a ring configured to accept wiring therethrough.

Figure 6:
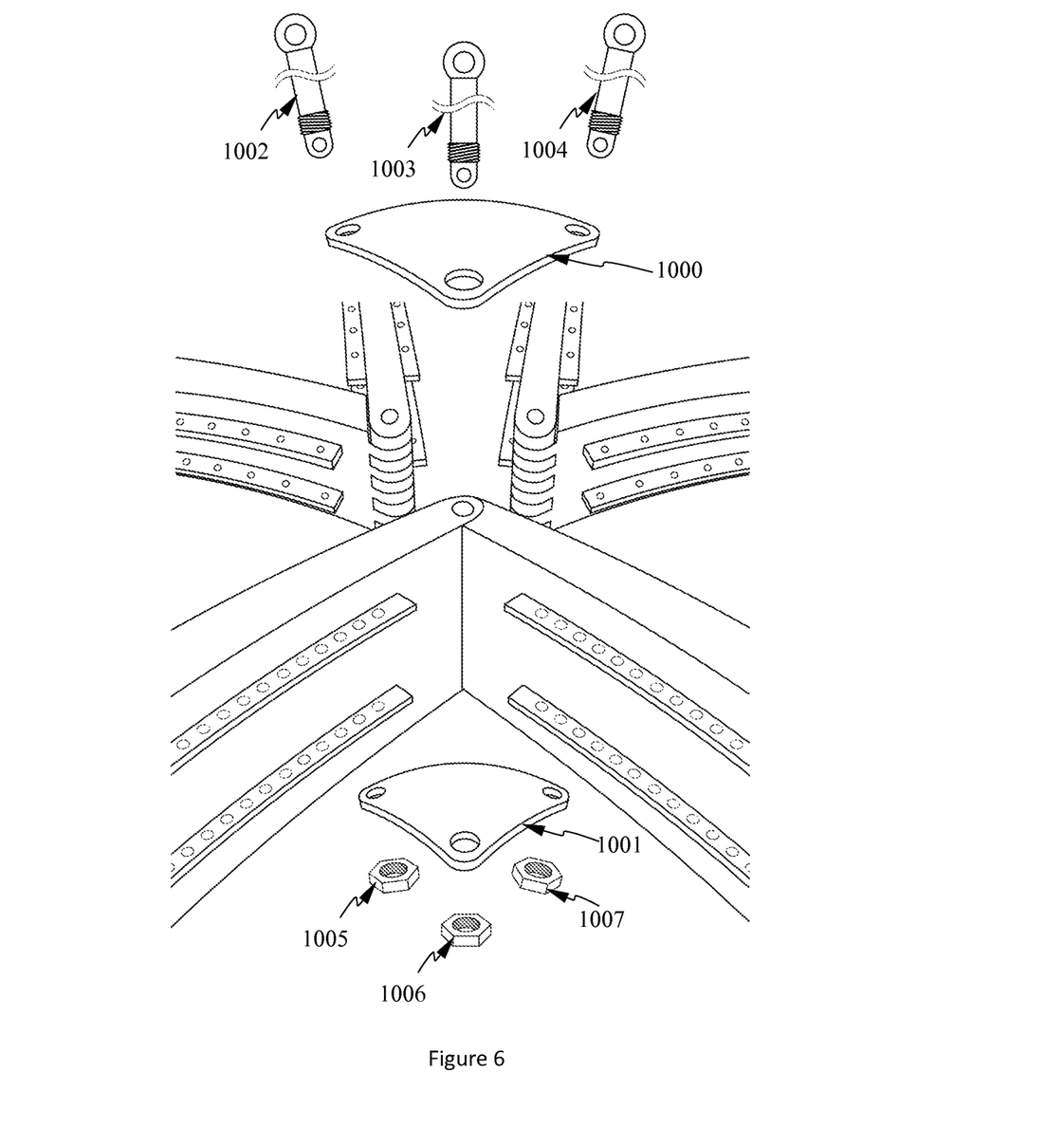
FIG. 6 is an explosion view of interconnection of three spherical triangular units of the structure according to an embodiment.
Figure 8A:
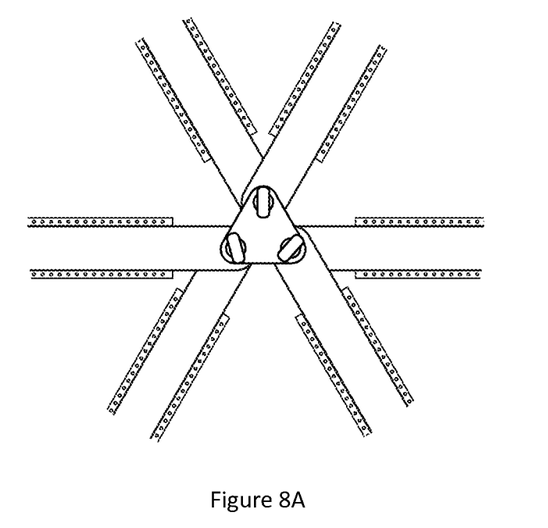
FIG. 8A is a front view of an interconnected portion of three spherical triangular units.
Figure 8B:
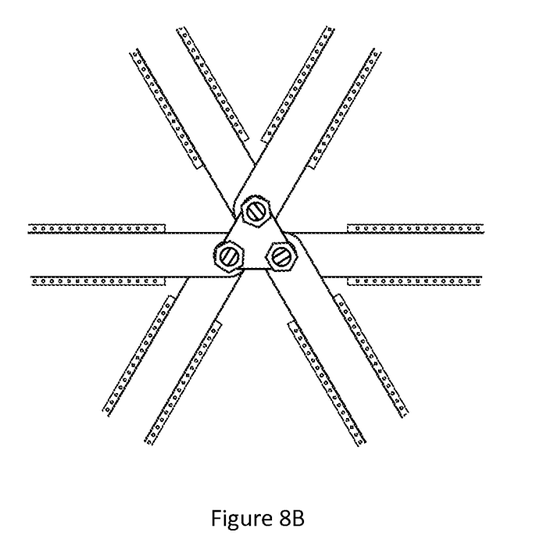
FIG. 8B is a back view of the interconnected portion of three spherical triangular units in 8A.

FIG. 6 is an explosion view of a portion of an embodiment showing interconnection of three spherical triangular units through a plurality of plates and fasteners. FIG. 8A is a top view according to the embodiment. FIG. 8B is a bottom view according to the embodiment. As shown in FIG. 6, three spherical triangular units are configured to be interconnected together through three adjoining corners by an outer plate 1000, an inner plate 1001, fasteners 1002, 1003, 1004 and nuts 1005, 1006 and 1007.

Figures 7A, 7B, 7C:
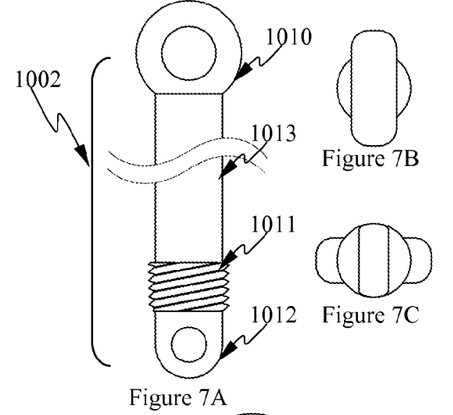
FIG. 7A is a side view of an embodiment of a fastener.
FIG. 7B is a front view of an embodiment of the fastener as shown in 7A.
FIG. 7C is a rear view of an embodiment of the fastener as shown in 7A.
Figure 7D:
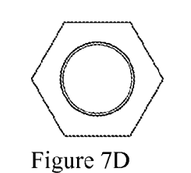
FIG. 7D is a front view of an embodiment of a nut.
Figure 7E:
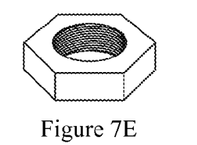
FIG. 7E is a perspective view of an embodiment of the nut as shown in 7D.
Figure 7F:
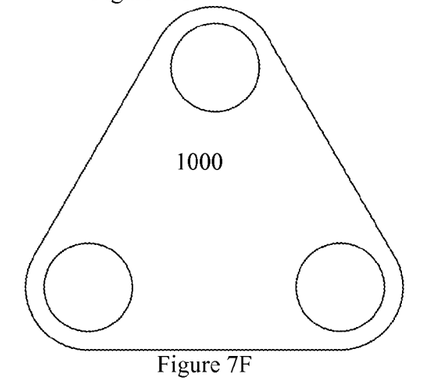
FIG. 7F is a front view of an embodiment of a outer plate.
Figure 7G:
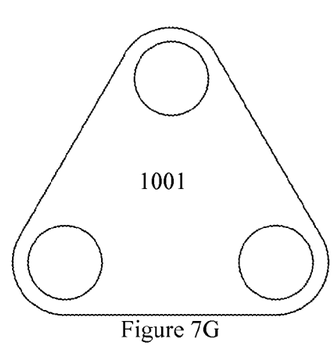
FIG. 7G is a front view of an embodiment of an inner plate.
Figure 7H:
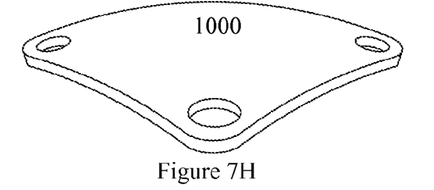
FIG. 7H is a perspective view of an embodiment of the outer plate as shown in 7F.

As shown in FIGS. 6, 7F and 7H, the outer plate 1000 is a substantially triangular shaped plate with smooth corners, with one through holes at each smooth corner. The outer plate 1000 comprises a surface contour that substantially conforms to the corresponding contact surface of the adjoining three spherical triangular units to be interconnected. The outer plate 1000 contacts hinge portions of the end surfaces of the three spherical triangular units to be interconnected.

Figure 7I:
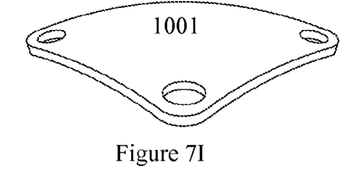
FIG. 7I is a perspective view of an embodiment of the inner plate as shown in 7G.

As shown in FIGS. 6, 7G and 7I, the inner plate 1001 is a substantially triangular shaped plate with smooth corners, with one through hole at each smooth corner. The inner plate 1001 comprises a surface contour that substantially conforms to the corresponding contact surface of the adjoining three spherical triangular units to be interconnected. The inner plate 1001 contacts hinge portions of the inner end surfaces of the three spherical triangular units to be interconnected As shown in FIGS. 6 and 8, three through holes of the outer plate 1000 are configured to be aligned with through holes of the hinges of three spherical triangular units, and with the three through holes of the inner plate 1001. such a configuration allows the securing of the aligned outer plate 1000, three spherical triangular units and the inner plate 1001 by fasteners. Through the connection with the two plates one on each side of three triangular units, three triangular units are interconnected together securely.

As shown in FIGS. 6 and 7A, fasteners 1002, 1003 and 1004 are essentially the same. A fastener may comprise a ring on an end configured to accept wiring therethrough. Such wirings are useful for attaching additional elements to the structure. Such an element may comprise a surface covering material, such as to provide additional functions in thermal insulation, water resistance, heat tolerance, mechanical reinforcement, etc.

As shown in FIG. 7A, a fastener 1002 comprises a first ring 1010 on an end, a threaded portion 1011, a non-threaded portion 1013, and a second ring 1012 on another end. Both rings 1010 and 1012 are configured to accept wirings therethrough. The threaded portion 1011 is configured to accept a matching nut 1005. The width of the threaded portion 1011, the unthreaded portion 1013 and the second ring 1012 are substantially the same, and are substantially the same as the inner width of the through holes of the hinges of a spherical triangular unit to be interconnected, and the inner width of the through holes of the inner plate 1001. The width of the first ring 1010 is substantially larger than the width of the unthreaded portion, and the width of the through holes of the outer plate 1000.

As shown in FIGS. 6 and 8B, nuts 1005, 1006 and 1007 are respectively connected to a fastener on its threaded portion, to complete the interconnection of three spherical triangular units. As shown in FIGS. 6, 7D and 7E, nuts 1005, 1006 and 1007 are essentially the same, and each of the nuts has an inner diameter that is substantially the same as the diameter of a threaded portion of a matching fastener.

Figure 9:
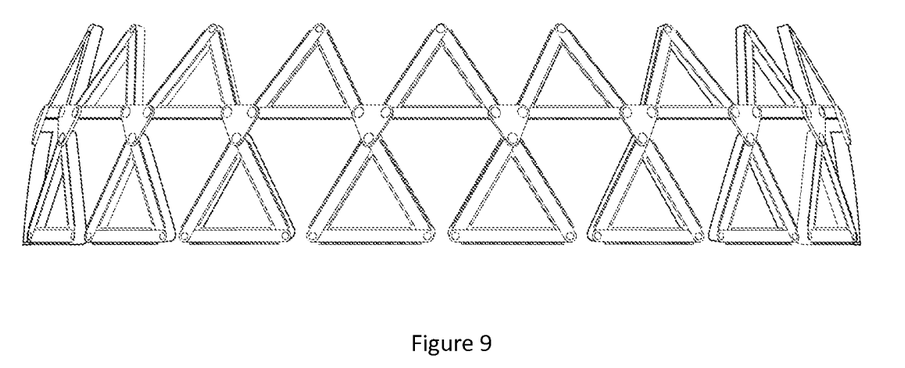
FIG. 9 is a front view of a first level and a second level of the structure according to an embodiment.

As shown in FIG. 9, the structure further comprises a first plurality of spherical triangular units, each of which is essentially identical to the first spherical triangular unit; the second spherical triangular unit is essentially identical to the first spherical triangular unit; the first plurality of spherical triangular units and the first and second spherical triangular units are essentially equally spaced radially along the third great circle, and constitute a first level of the structure.

As shown in FIGS. 9-10, the structure further comprises a second plurality of spherical triangular units, each of which is essentially identical to the third spherical triangular unit; wherein the second plurality of spherical triangular units and the third spherical triangular unit are essentially equally spaced radially relative to a center of the sphere 10 (see FIG. 10), and constitute a second level of the structure.

Figure 11:
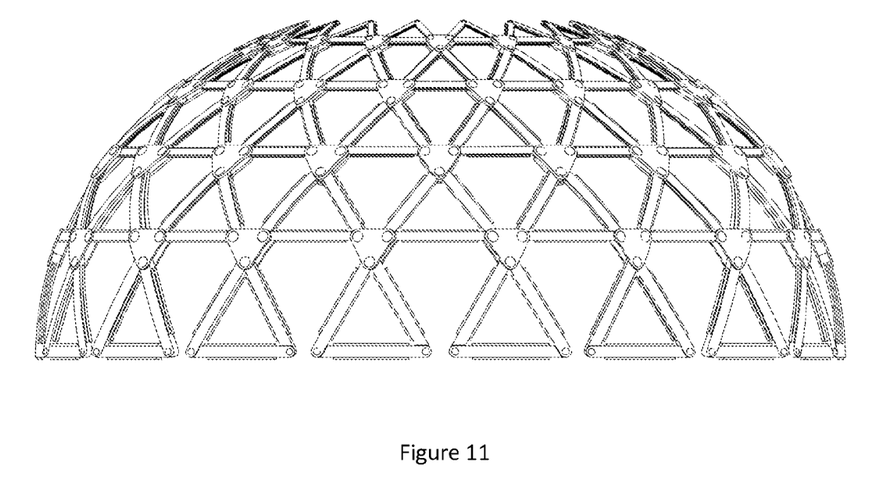
FIG. 11 is a front view of the structure being a multiple level dome, according to an embodiment.

According to embodiments in FIGS. 10-11, the structure further comprises a plurality of levels comprising a plurality of spherical triangular units; the plurality of spherical triangular units on one level of the plurality of levels are essentially identical to each other, and are essentially equally spaced radially relative to the center of the sphere; each of the plurality of spherical triangular units located on a level above the first level comprises three planar panels, each with an end surface comprising a minor arc of a great circle of the sphere; a spherical triangular unit on a level above the first level of the structure is configured to be joined with two neighboring spherical triangular units on the level below; the structure is substantially a dome.

According to embodiments as shown in FIGS. 10 and 11, the structure essentially forms a dome structure. The structure has essentially a spherical surface that matches the sphere 10. The number of structural units, i.e. the spherical triangular units, on each level of the structure may be adjusted. Increasing the number of the spherical triangular units will increase the density and the mechanical strength of the overall structure. The number of the spherical triangular units may be designed with consideration of mechanical strength, usefulness and practicality, thereby allowing building dome structures of different overall sizes.

The design of inner or inter-triangular-unit covers substantially completes the look and function of the dome structure. According to an embodiment, inner or inter-triangular-unit covers may comprise surface contour that substantially conform to a portion of the surface of the sphere 10, such that the dome structure extremely approximates an ideal hemisphere surface of the sphere.

The structure may further comprise a foundation of concrete and reinforced steel bars, for providing security and strength.

According to an embodiment, one spherical triangular unit on the first level of the structure is interconnected with a neighboring spherical triangular unit on the first level and with the foundation of the structure by an outer plate, an inner plate, one or more fasteners and bolts.

The structure may further comprise windows and entryways. Windows may be designed to fit within an intra-unit or an inter-unit opening of the spherical triangular units, or may be designed as a skylight at the top of the structure. Entryways may be designed as a cut out of the structure.

The structure of this disclosure has a superior ability to survive disasters such as tornadoes, hurricanes, earthquakes etc. It is cost-efficient, energy efficient, extremely durable and easily maintained. It is also easy to assemble from prefabricated parts. The structure can be constructed on virtually any site such as in the mountains, on beaches, even underground or underwater without requiring large and heavy construction equipments. The structure, when properly designed with considerations of the need of its users, may be adapted as homes, offices, schools, churches, storages, emergency shelters and so on.

In relation to the claims, it is intended that when words such as "a," "an," "at least one," or "at least one portion" are used to preface a feature there is no intention to limit the claim to only one such feature unless specifically stated to the contrary in the claim.

The descriptions above are intended to be illustrative, not limiting. Thus, it will be apparent to one skilled in the art that modifications may be made without departing from the scope of the claims set out below.

What is claimed is:

1. A structure comprising a first spherical triangular unit, a second spherical triangular unit and a third spherical triangular unit;
   the first spherical triangular unit comprising a first planar panel, a second planar panel and a third planar panel;
   the second spherical triangular unit comprising a fourth planar panel, a fifth planar panel and a sixth planar panel;
   the third spherical triangular unit comprising a seventh planar panel, an eighth planar panel and a ninth planar panel;
   the first planar panel comprising a first end surface, the second planar panel comprising a second end surface, the third planar panel comprising a third end surface;
   the fourth planar panel comprising a fourth end surface, the fifth planar panel comprising a fifth end surface, and the sixth planar panel comprising a sixth end surface;
   the seventh planar panel comprising a seventh end surface, the eighth planar panel comprising an eighth end surface, and the ninth planar panel comprising a ninth end surface;
   wherein the first end surface comprises a minor arc of a first great circle of a sphere;
   wherein the second end surface comprises a minor arc of a second great circle of the sphere;
   wherein the third end surface comprises a minor arc of a third great circle of the sphere;
   wherein the fourth end surface comprises a minor arc of a fourth great circle of the sphere;
   wherein the fifth end surface comprises a minor arc of a fifth great circle of the sphere;
   wherein the sixth end surface comprises a minor arc of the third great circle of the sphere;
   wherein the seventh end surface comprises a minor arc of a seventh great circle of the sphere;
   wherein the eighth end surface comprises a minor arc of an eighth great circle of the sphere;
   wherein the ninth end surface comprises a minor arc of a ninth great circle of the sphere;
   wherein the seventh planar panel and the ninth planar panel join and form a corner of the third spherical triangular unit, the first planar panel and the second planar panel join and form a corner of the first spherical triangular unit, the corner of the first spherical triangular unit is connected to the corner of the third spherical triangular unit;
   wherein the eighth planar panel and the ninth planar panel join and form another corner of the third spherical triangular unit, the fourth planar panel and the fifth planar panel join and form a corner of the second spherical triangular unit, the other corner of the third spherical triangular unit is connected to the corner of the second spherical triangular unit;
   wherein the structure further comprising a plurality of plates, configured to connect the first spherical triangular unit to the third spherical triangular unit, and to connect the second spherical triangular unit to the third spherical triangular unit;
   wherein the structure further comprising a plurality of fasteners configured to join the plurality of plates to the first, second and third spherical triangular units through a plurality of through holes on the first, second and third spherical triangular units; and wherein at least one of the plurality of fasteners comprises a ring configured to accept wiring therethrough.

2. The structure of claim 1, wherein central angles of the first end surface, second end surface, third end surface, fourth end surface, fifth end surface and sixth end surface are essentially the same.

3. The structure of claim 1, wherein central angles of the seventh, eighth and ninth end surfaces are essentially the same.

4. The structure of claim 1, wherein
the first planar panel extends from the first end surface toward a center of the sphere along a surface of the first great circle;
the second planar panel extends from the second end surface toward the center of the sphere on a surface of the second great circle; and
the third planar panel extends from the third end surface toward the center of the sphere on a surface of the third great circle.

5. The structure of claim 4, wherein the first planar panel extends from the first end surface to a first inner end surface which comprises an arc concentric with the first end surface; wherein the second planar panel extends from the second end surface to a second inner end surface which comprises an arc concentric with the second end surface; wherein the third planar panel extends from the third end surface to a third inner end surface which comprises an arc concentric with the third end surface.

6. The structure of claim 5, wherein central angles of the first, second, and third inner end surfaces are essentially the same.

7. The structure of claim 5, wherein radii of the first, second, and third inner end surfaces are essentially the same.

8. The structure of claim 1, wherein the first and the second planar panel are joined by a hinge; wherein the second and third planar panels are joined by a hinge; wherein the first and third planar panels are joined by a hinge.

9. The structure of claim 1, wherein the first, second and third planar panels comprise one or more inner ridges configured to accept or secure one or more intra-triangular-unit covers that are configured to fit into and cover an intra-unit opening of the first triangular unit.

10. The structure of claim 1, wherein the first, second and third planar panels comprise one or more outer ridges configured to accept or secure one or more inter-triangular-unit covers that are configured to fit into and cover an inter-unit opening of adjacent spherical triangular units.

11. The structure of claim 1, wherein at least one of the first, second and third planar panels comprises a material selected from a group consisting of aluminum, iron, steel, glass fiber, carbon fiber, plastic, wood and a combination thereof.

12. The structure of claim 1, wherein the ninth great circle passes through an intersection of the first end surface and the second end surface and passes through an intersection of the fourth end surface and the fifth end surface; wherein the ninth end surface is a minor arc of the ninth circle between the intersection of the first end surface and the second end surface and the intersection of the fourth end surface and the fifth end surface.

13. The structure of claim 1, further comprising a first plurality of spherical triangular units, each of which is essentially identical to the first spherical triangular unit; the second spherical triangular unit is essentially identical to the first spherical triangular unit; wherein the first plurality of spherical triangular units and the first and second spherical triangular units are essentially equally spaced radially along the third great circle, and constitute a first level of the structure.

14. The structure of claim 13, further comprising a second plurality of spherical triangular units, each of which is essentially identical to the third spherical triangular unit; wherein the second plurality of spherical triangular units and the third spherical triangular unit are essentially equally spaced radially relative to a center of the sphere, and constitute a second level of the structure.

15. The structure of claim 14, further comprising a plurality of levels comprising a plurality of spherical triangular units; the plurality of spherical triangular units on one level of the plurality of levels are essentially identical to each other, and are essentially equally spaced radially relative to a center of the sphere; each of the plurality of spherical triangular units located on a level above the first level comprises three planar panels, each with an end surface comprising a minor arc of a great circle of the sphere; a spherical triangular unit on a level above the first level of the structure is configured to be joined with two neighboring spherical triangular units on the level below; the structure is substantially a dome.

* * * * *